United States Patent
Miyata et al.

(10) Patent No.: US 6,947,872 B2
(45) Date of Patent: Sep. 20, 2005

(54) REMOTE MAINTENANCE REPEATER AND INTERNETWORK CONNECTOR

(75) Inventors: Saori Miyata, Toyohashi (JP); Hiroshi Sugawara, Kawasaki (JP); Masahiro Ichimi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 10/665,408

(22) Filed: Sep. 22, 2003

(65) Prior Publication Data
US 2004/0133399 A1 Jul. 8, 2004

(30) Foreign Application Priority Data
Sep. 26, 2002 (JP) ........................................ 2002-281452

(51) Int. Cl.$^7$ ................................................. G06F 11/00
(52) U.S. Cl. ........................ 702/188; 375/211; 709/223; 455/73; 455/500
(58) Field of Search ......................... 702/188; 375/130, 375/211, 146, 147; 370/347, 445, 452; 709/203, 223; 455/500, 73

(56) References Cited

U.S. PATENT DOCUMENTS

| | | | | |
|---|---|---|---|---|
| 5,276,703 A | * | 1/1994 | Budin et al. ................. | 375/130 |
| 5,996,021 A | * | 11/1999 | Civanlar et al. ............. | 709/238 |
| 6,154,770 A | * | 11/2000 | Kostakos ..................... | 709/217 |
| 6,826,405 B2 | * | 11/2004 | Doviak et al. ............... | 455/445 |

FOREIGN PATENT DOCUMENTS

| | | |
|---|---|---|
| JP | 8-293918 | 11/1996 |
| JP | 11-219388 | 8/1999 |
| JP | 2002-14881 | 1/2002 |

* cited by examiner

Primary Examiner—Bryan Bui
Assistant Examiner—Hien Vo
(74) Attorney, Agent, or Firm—Staas & Halsey LLP

(57) ABSTRACT

A remote maintenance repeater is used in a remote monitoring system. A command receiving unit receives a command from the monitoring apparatus. A destination selecting unit selects a transfer destination device to which the command received is transferred. A command transmitting unit transmits the command to the transfer destination device selected, at a specific frequency specific to the transfer destination device. A result receiving unit receives a result of execution of the command from the transfer destination device at the specific frequency. A result transmitting unit transmits the result to the monitoring apparatus.

16 Claims, 13 Drawing Sheets

FIG.3
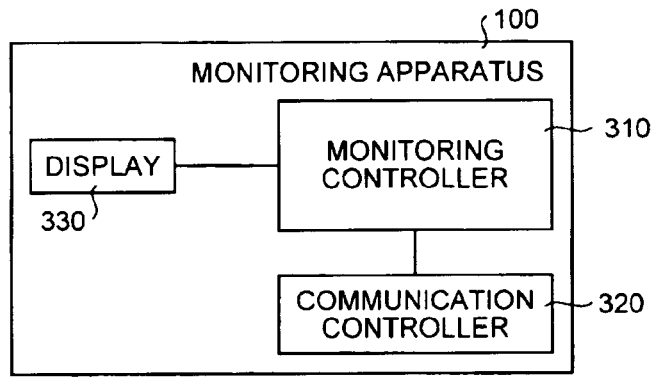
FIG.4
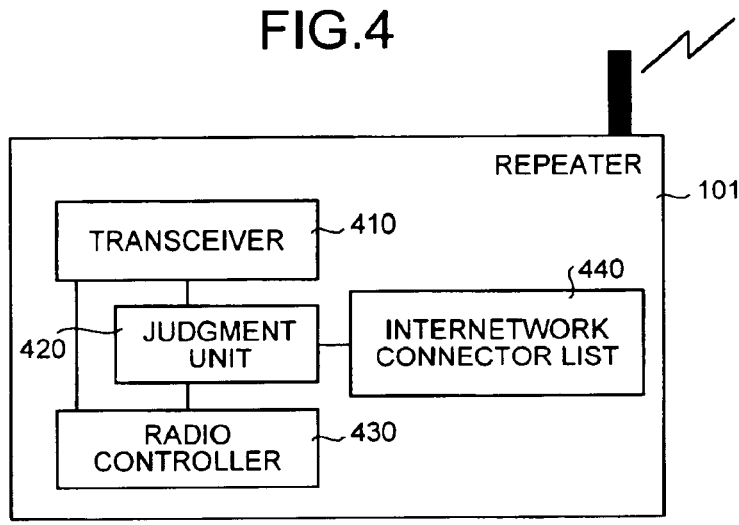
FIG.5
| DEVICE NAME | TRANSFER DESTINATION | FREQUENCY |
|---|---|---|
| A | A | 10 |
| B | B | 20 |
| C | C | 30 |
| D | C | 30 |
| E | REPEATER 2 | 100 |
| F | REPEATER 2 | 100 |

| DEVICE NAME | ADDRESS | PORT | NUMBER OF HOPS |
|---|---|---|---|
| A | 10.17.201.1 | E0 | 1 |
| B | 10.17.202.1 | E0 | 1 |
| C | — | — | — |
| D | 10.17.204.1 | E0 | 1 |

FIG.12
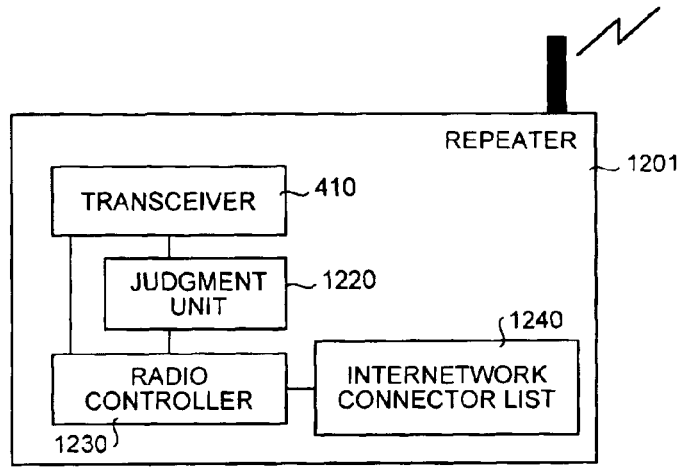
FIG.13
| DEVICE NAME | MAC ADDRESS |
|---|---|
| A | 00 : 00 : 00 : 00 : 01 : 01 |
| B | 00 : 00 : 00 : 00 : 05 : 01 |
| C | 00 : 00 : 00 : 00 : 04 : 09 |
| D | 00 : 00 : 00 : 00 : 01 : 06 |
| E | 00 : 00 : 00 : 00 : 02 : 05 |
| F | 00 : 00 : 00 : 00 : 02 : 04 |
FIG.14
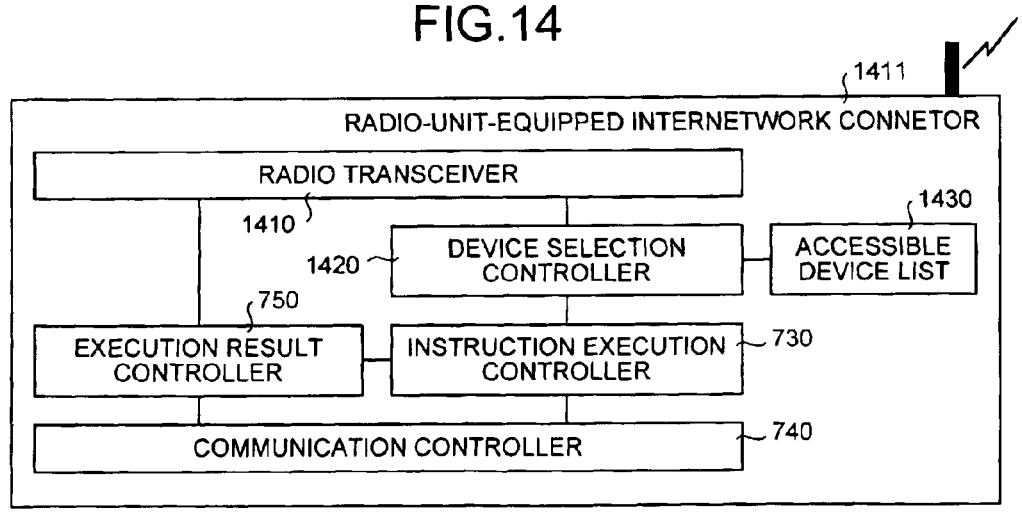

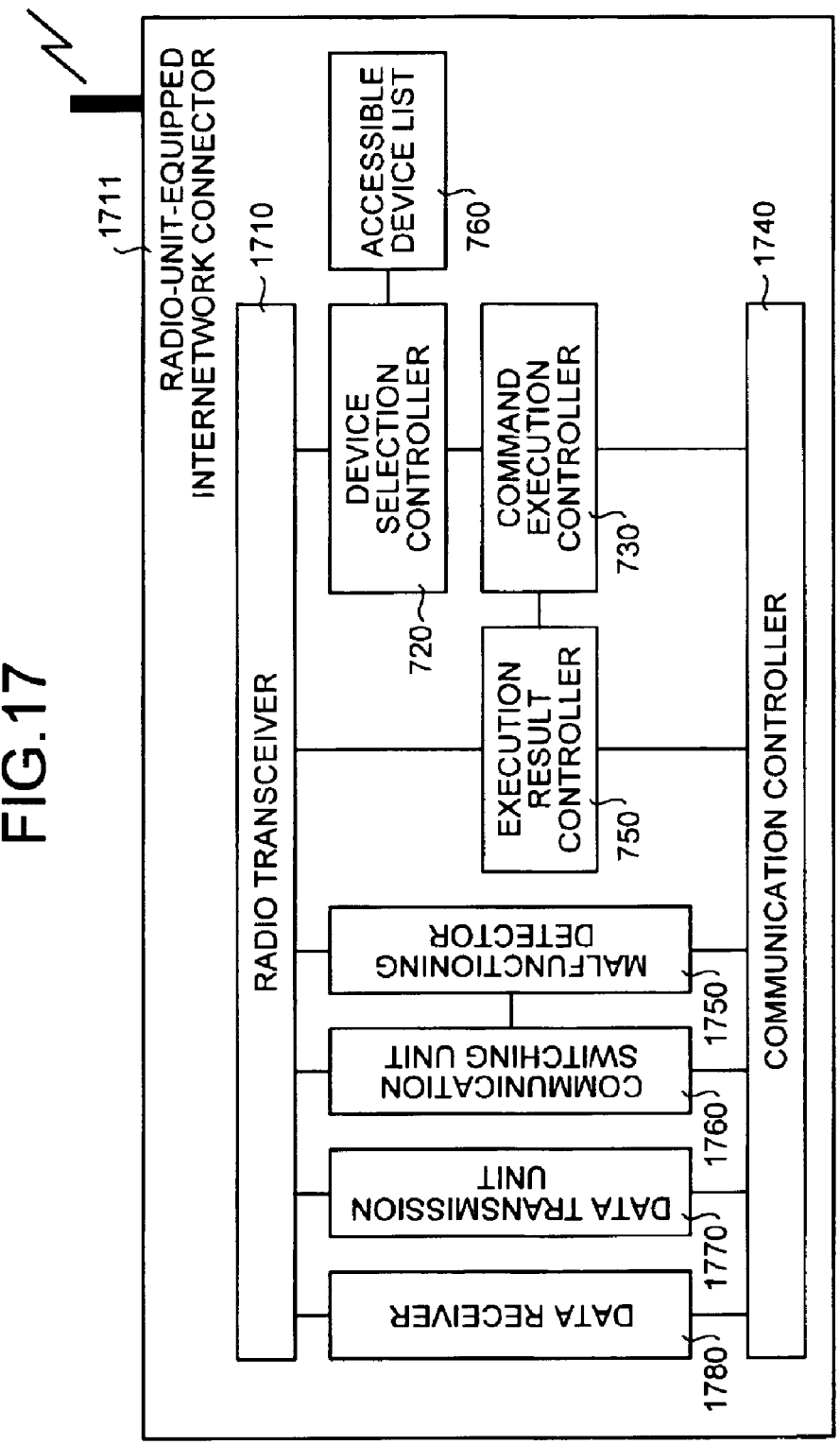

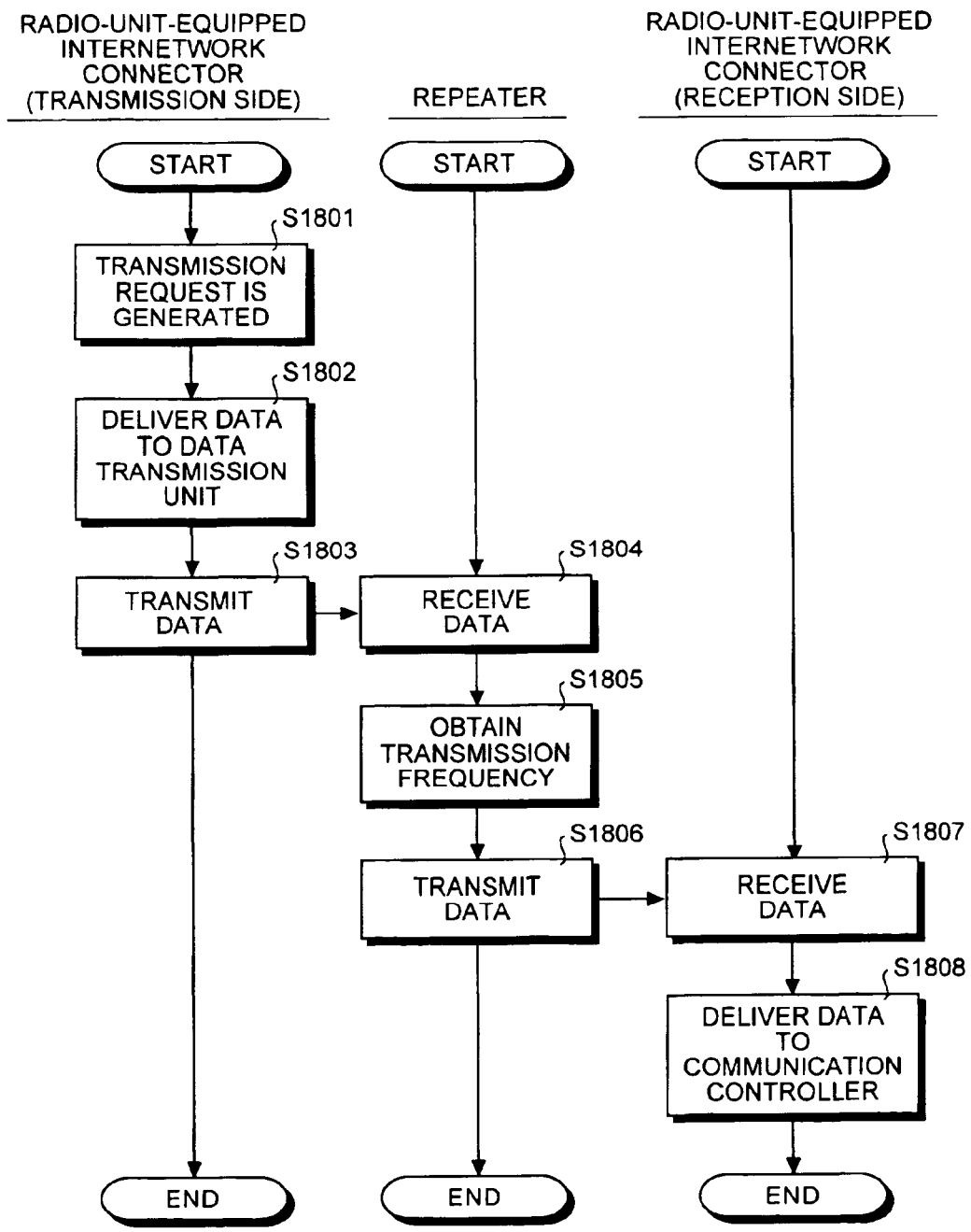

REMOTE MAINTENANCE REPEATER AND INTERNETWORK CONNECTOR

BACKGROUND OF THE INVENTION

1) Field of the Invention

The present invention relates to a technology to reduce communication cost for remote maintenance of the internetwork connector and to build a trouble-resistant remote monitoring system.

2) Description of the Related Art

Recently, a considerable number of computer networks have been built with the spread of the Internet. Since malfunctioning of internetwork connectors such as routers, hubs, and switches that connect the computer networks with each other seriously affects the computer network, a maintenance of such connectors is of great importance.

Normally, the maintenance of the internetwork connectors is performed by directly connecting a monitoring apparatus located in a remote area with the respective internetwork connectors using an information network system (INS) or an exclusive line, such that the monitoring apparatus obtains data from the internetwork connectors via the connecting lines (see for example, FIG. 1 and page 3 of Japanese Patent Application No. 11-219388, FIG. 1 and page 3 of Japanese Patent Application No. 8-293918).

Another approach is to directly connect the monitoring apparatus with a predetermined internetwork connector, so that the monitoring apparatus exchanges data with other internetwork connectors via LAN (Local Area Network) and the predetermined internetwork connector (see for example, FIG. 1 and page 3 of Japanese Patent Application No. 2002-14881).

However, with the direct connection of the monitoring apparatus located in a remote area with the respective internetwork connectors via the INS or the exclusive lines, the number of the INS or exclusive lines to be used increases with an increase in the number of the internetwork connectors, resulting in an increase of the communication cost.

Furthermore, in order to connect a monitoring apparatus with an internetwork connector located in a remote area via the INS or the exclusive line, it is necessary to fix the monitoring apparatus at a place connectable with the INS or the exclusive line, thereby the place to be maintained is limited.

Even when it is desired to collect information at the same time by transmitting a command to a plurality of internetwork connectors simultaneously, since a single operation can transmit the command to only one internetwork connector, the command is transmitted sequentially to the internetwork connectors, resulting in a time-delayed collection of the information.

When a monitoring apparatus is directly connected with a predetermined internetwork connector, so that the monitoring apparatus exchanges data with other internetwork connectors via the LAN and the predetermined internetwork connector, if there is a problem with the LAN connection between the predetermined internetwork connector and the other internetwork connectors, the maintenance of the other internetwork connectors cannot be performed.

SUMMARY OF THE INVENTION

It is an object of the present invention to solve at least the problems in the conventional technology.

The remote maintenance repeater according to one aspect of the present invention, which is used in a remote monitoring system, includes a command receiving unit that receives a command from the monitoring apparatus, a destination selecting unit that selects a transfer destination device to which the command is to be transferred, wherein the transfer destination device is an internetwork connector or another remote maintenance repeater, a command transmitting unit that transmits the command to the transfer destination device, at a specific frequency specific to the transfer destination device, a result receiving unit that receives a result of execution of the command from the transfer destination device at the specific frequency, and a result transmitting unit that transmits the result to the monitoring apparatus, wherein the remote monitoring system includes a plurality of internetwork connectors that respectively connect a network with another network and a monitoring apparatus that monitors and remotely maintains the internetwork connectors.

The remote maintenance repeater according to another aspect of the present invention includes a command receiving unit that receives a command from the monitoring apparatus, an information obtaining unit that obtains an identification information for uniquely identifying a transfer destination device comprising an internetwork connector or another remote maintenance repeater, to which the command is transferred, a packet generating unit that generates a control packet including the identification information, a radio command transmitting unit that transmits the control packet and the command by radio at a predetermined frequency, a radio result receiving unit that receives a result of execution of the command by radio, and a result transmitting unit that transmits the result to the monitoring apparatus.

The internetwork connector according to still another aspect of the present invention, which connects a network with another network, includes a radio command receiving unit that receives a command from a remote maintenance repeater by radio at a specific frequency specific to the internetwork connector, a command executing unit that executes the command, and a radio result transmitting unit that transmits a result of execution to the remote maintenance repeater by radio at the specific frequency.

The internetwork connector according to still another aspect of the present invention includes a radio command receiving unit that receives a control packet and a command from a remote maintenance repeater by radio at a predetermined frequency, a response judging unit that makes a judgment whether it is appropriate to respond to the remote maintenance repeater based on the identification information included in the control packet, a responding unit that responds to the remote maintenance repeater based on the judgment, a command executing unit that executes the command, and a radio result transmitting unit that transmits a result of execution by radio at the predetermined frequency.

The remote maintenance repeating method according to still another aspect of the present invention, which is for a remote monitoring system, includes receiving a command from the monitoring apparatus, selecting a transfer destination device comprising an internetwork connector or another remote maintenance repeater, to which the command is to be transferred, transmitting the command to the transfer destination device by radio at a specific frequency specific to the transfer destination device, receiving a result of execution of the command from the transfer destination device by radio at the specific frequency, and transmitting the result to the monitoring apparatus, wherein the remote monitoring system includes a plurality of internetwork connectors that respectively connect a network with another network and a monitoring apparatus that monitors and remotely maintains the internetwork connectors.

The maintenance method according to still another aspect of the present invention, which is for an internetwork connector that connects a network with another network, includes receiving a command from a remote maintenance repeater by radio at a specific frequency specific to the internetwork connector, executing the command, and transmitting a result of execution to the remote maintenance repeater by radio at the specific frequency.

The computer program according to still another aspect of the present invention realizes the methods according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a block diagram of the functional configuration of a monitoring apparatus shown in FIG. 1;

FIG. 4 is a block diagram of the functional configuration of a repeater shown in FIG. 1;

FIG. 5 is an example of an internetwork connector list included in the repeater;

FIG. 12 is a block diagram of the functional configuration of a repeater according to a second embodiment of the present invention;

FIG. 13 is an example of an internetwork connector identification table provided in the repeater;

FIG. 14 is a block diagram of the functional configuration of a radio-unit-equipped internetwork connector according to the second embodiment;

FIG. 17 is a block diagram of the functional configuration of a radio-unit-equipped internetwork connector according to the third embodiment; and FIG. 18 is a flowchart of the communication between the repeater and the radio-unit-equipped internetwork connector according to the third embodiment.

DETAILED DESCRIPTION

Figure 1:
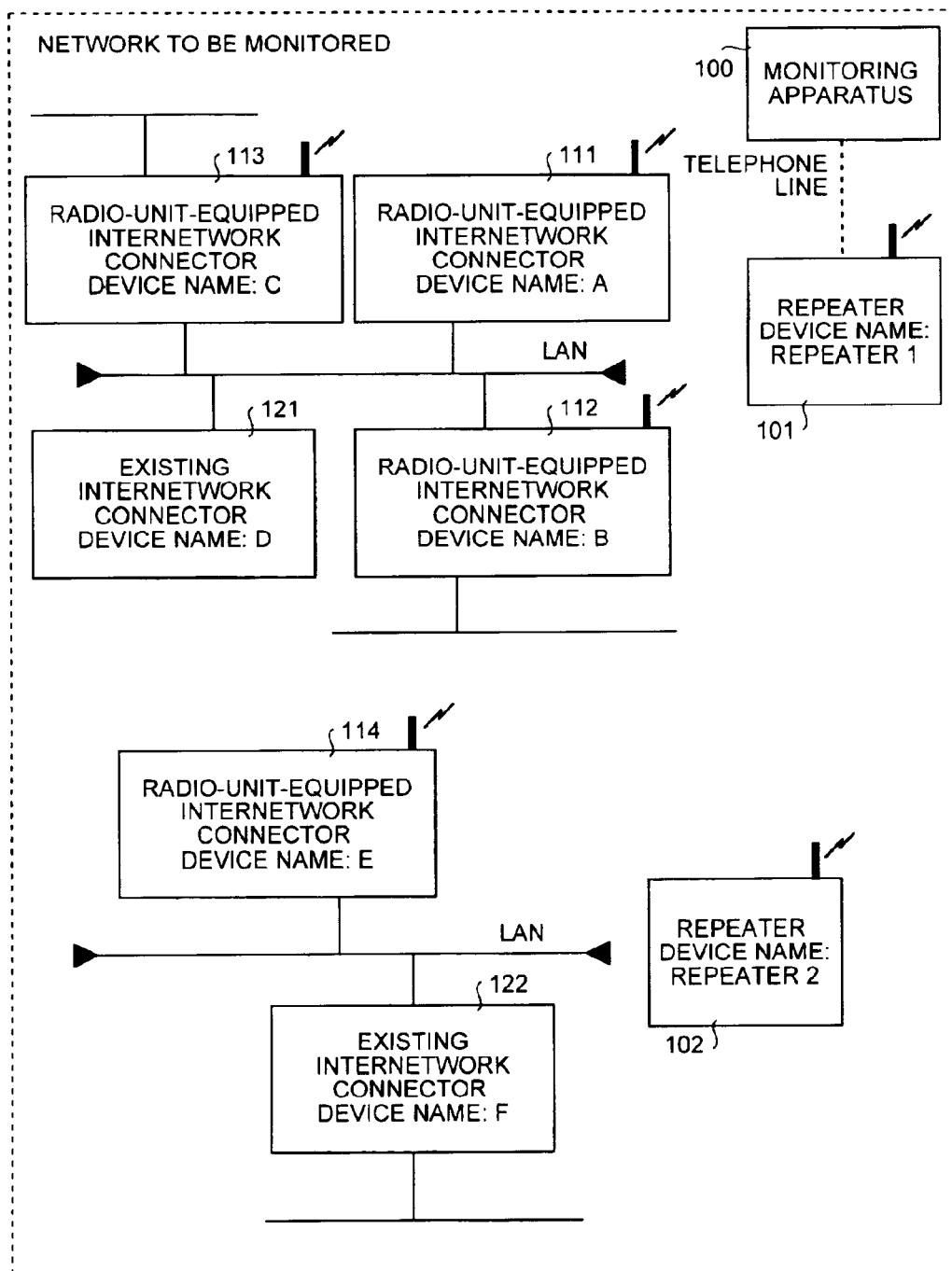
FIG. 1 is a block diagram of the system configuration of a remote monitoring system according to a first embodiment of the present invention.

Exemplary embodiments of a remote maintenance repeater and an internetwork connector according to the present invention are explained in detail with reference to the accompanying drawings FIG. 1 is a block diagram of the system configuration of a remote monitoring system according to a first embodiment of the present invention. The remote monitoring system includes a monitoring apparatus 100, repeaters 101 and 102, radio-unit-equipped internetwork connectors 111 to 114, and existing internetwork connectors 121 and 122.

The monitoring apparatus 100 monitors a computer network formed with the radio-unit-equipped internetwork connectors 111 to 114 and existing internetwork connectors 121 and 122, and performs maintenance of these internetwork connectors 111 to 114, 121 and 122 from a remote area. The monitoring apparatus 100 is connected to a repeater 101 by a telephone line, and performs maintenance of the radio-unit-equipped internetwork connectors 111 to 113, and the existing internetwork connector 121, via the repeater. Further, the monitoring apparatus 100 performs maintenance of the radio-unit-equipped internetwork connector 114, and the existing internetwork connector 122, via the repeater 101 and the repeater 102.

The repeaters 101 and 102 are apparatus that relay the data transferred between the monitoring apparatus 100 and the radio-unit-equipped internetwork connectors 111 to 114. The repeater 101 manages the radio-unit-equipped internetwork connectors 111 to 113 and the existing internetwork connector 121 connected to the same LAN, and can communicate with the radio-unit-equipped internetwork connectors 111 to 113 by radio. The repeater 102 manages the radio-unit-equipped internetwork connector 114 and the existing internetwork connector 122 connected to the same LAN, and can communicate with the radio-unit-equipped internetwork connector 114 by radio.

The repeaters 101 and 102 can transfer data by radio communication, and the radio-unit-equipped internetwork connector 114 can communicate with the monitoring apparatus 100 via the repeater 102 and the repeater 101. Although only two repeaters are employed to simplify the explanation, the range of the computer network to be maintained can be extended by increasing the number of repeaters.

The radio-unit-equipped internetwork connectors 111 to 114 are internetwork connectors such as routers, hubs, and switches connecting the LAN with other networks, and can communicate with the repeater 101 or the repeater 102 by radio.

The existing internetwork connectors 121 and 122 are internetwork connectors such as routers, hubs, and switches connecting the LAN with other networks, like the radio-unit-equipped internetwork connectors 111 to 114, without having a function of the radio communication. Therefore, the existing internetwork connector 121 communicates with the repeater 101 through the radio-unit-equipped internetwork connector 113 via the LAN, and the existing internetwork connector 122 communicates with the repeater 102 through the radio-unit-equipped internetwork connector 114 via the LAN.

Figure 2:
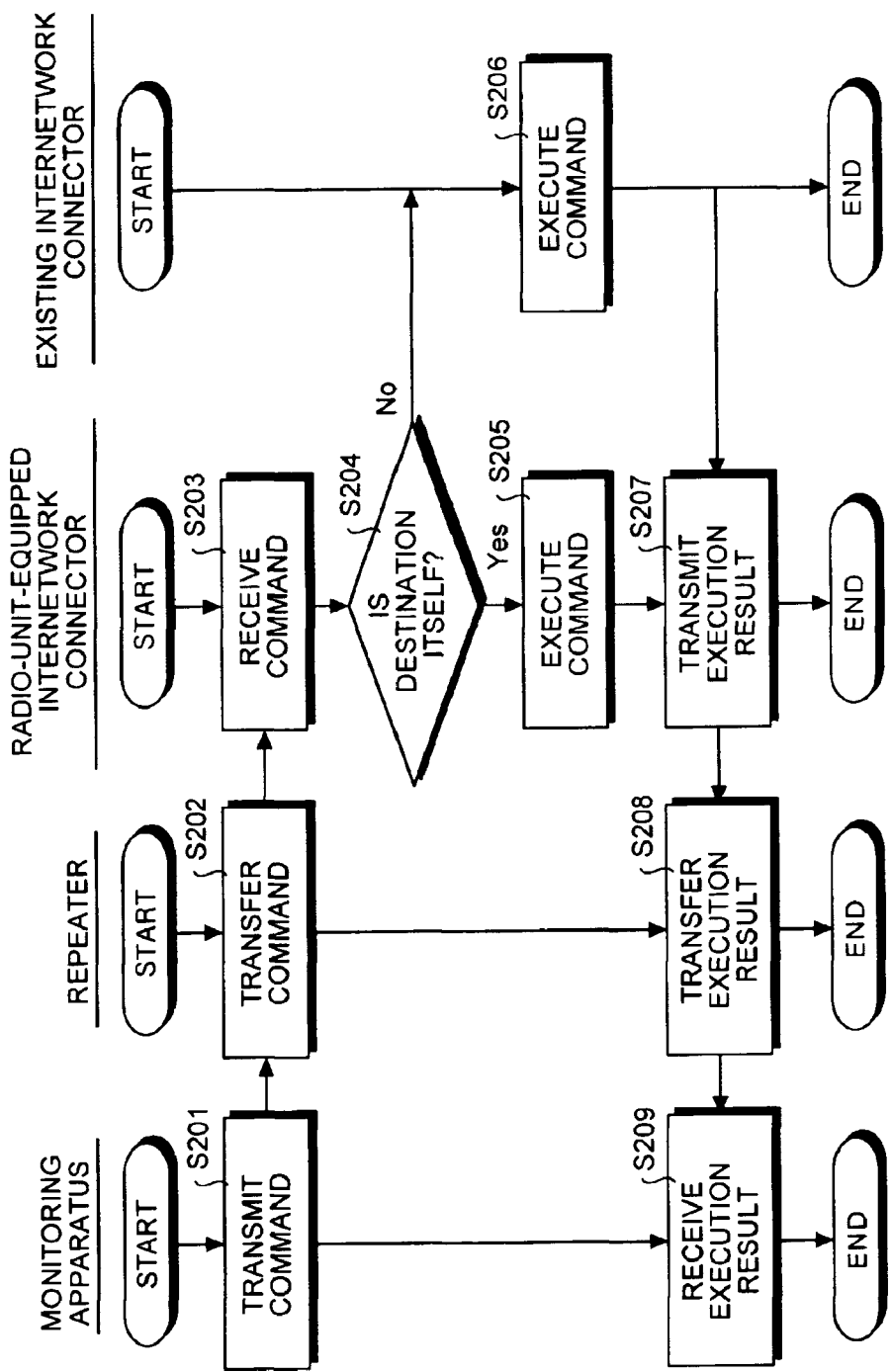
FIG. 2 is a flowchart of the operation of the remote monitoring system shown in FIG. 1.

FIG. 2 is a flowchart of the operation of the remote monitoring system shown in FIG. 1. When the monitoring apparatus 100 judges that it is necessary to access the internetwork connectors 111 to 114, 121 and 122, the monitoring apparatus 100 transmits a command to the repeater 101 using a telephone line (step 201). The internetwork connector to be accessed may be plural.

Upon receiving the command, the repeater 101 transfers the command to the radio-unit-equipped internetwork connector specified as the destination of the command (step S202). At this time, when the radio-unit-equipped internetwork connector 114 is included in the destination, the command is transferred via the repeater 102. When the existing internetwork connector 121 that cannot be communicated by radio is included in the destination, the command is transferred via the radio-unit-equipped internetwork connector 113. In the same manner, when the existing internetwork connector 122 is included in the destination, the command is transferred via the radio-unit-equipped internetwork connector 114.

After receiving the command (step S203), the radio-unit-equipped internetwork connectors 111 to 114 judge the destination of the command (step S204), and execute the command if the connector itself is included in the destination (step S205). If the existing internetwork connectors 121 and 122 are included in the destination, the radio-unit-equipped internetwork connectors 111 to 114 transfer the command to the existing internetwork connectors 121 and 122 via the LAN. The existing internetwork connectors 121 and 122 execute the received command (step S206), and transmit the result of execution to the radio-unit-equipped internetwork connectors 113 and 114 via the LAN.

The radio-unit-equipped internetwork connectors 111 to 113 transmit the result of execution to the repeater 101, and the radio-unit-equipped internetwork connector 114 transmits the result of execution to the repeater 101 via the repeater 102 (step S207). The repeater 101 transfers the result of execution to the monitoring apparatus 100 through the telephone line (step S208), and the monitoring apparatus 100 receives the result of execution (step S209).

FIG. 3 is a block diagram of the functional configuration of the remote monitoring system shown in FIG. 1. The monitoring apparatus 100 includes a monitoring controller 310, a communication controller 320, and a display 330.

The monitoring controller 310 controls a collection of maintenance information, and manages control of setting information, wherein the monitoring controller 310 determines the time to transmit a command, the internetwork connector to be maintained, and commands to be transmitted. The communication controller 320 uses the repeater 101 and the telephone line for communication. The display 330 is a device that displays the result of execution of the command and the like at the internetwork connectors.

The monitoring apparatus 100 communicates with the repeater 101, using a telephone line, without requiring an INS or an exclusive line, to access the respective internetwork connectors via the repeater 101. Therefore, the communication cost required for the remote maintenance can be reduced, and remote maintenance can be performed from anywhere, without having any limitation in the installation place.

FIG. 4 is a block diagram of the functional configuration of the repeater 101 shown in FIG. 1. The repeater 101 includes a transceiver 410, a judgment unit 420, a radio controller 430, and an internetwork connector list 440.

The transceiver 410 communicates with the monitoring apparatus 100 using the telephone line. The judgment unit 420 determines the transfer destination of the received command and the frequency to be used, based on the internetwork connector list 440. The judgment unit 420 also judges whether the access to the repeater 101 by the telephone line is correct.

The radio controller 430 controls the radio communication with the transfer destination of the command determined by the judgment unit 420. The radio controller 430 can transfer the command to a plurality of transfer destinations at the same time using different frequencies.

Therefore, a plurality of radio-unit-equipped internetwork connectors 111 to 113 can execute the command at the same time, making it possible to collect information of the radio-unit-equipped internetwork connectors 111 to 113 at the same time. As a result, maintenance can be performed with a higher reliability.

Since a network for maintenance, which is independent of the network to be maintained, can be built, even if a malfunctioning occurs in the network to be maintained, the radio-unit-equipped internetwork connectors 111 to 114 can be accessed by radio, and hence a trouble-resistant remote monitoring system can be built.

The internetwork connector list 440 is a list storing the transfer destinations of commands and radio frequencies to be used for transferring commands to the internetwork connectors. FIG. 5 illustrates an example of the internetwork connector list 440 included in the repeater 101. As shown in the figure, the internetwork connector list 440 includes a device name field for names of the internetwork connectors, a transfer destination field for the transfer destination of a command, and a frequency field for the frequency to be used, for managing each internetwork connector.

For example, with regard to the internetwork connector having the device name A, it is indicated that the transfer destination of a command is the connector itself, and the frequency to be used is 10. Similarly, with regard to the internetwork connector having the device name B, it is indicated that the transfer destination of a command is the connector itself, and the frequency to be used is 20. With regard to the internetwork connector having the device name C, it is indicated that the transfer destination of a command is the connector itself, and the frequency to be used is 30. These internetwork connectors correspond to the radio-unit-equipped internetwork connectors 111 to 113 shown in FIG. 1. Since these devices can communicate with the repeater 101 by radio, the transfer destination of a command is the connector itself.

On the other hand, with regard to the internetwork connector having the device name D, it is indicated that the transfer destination of a command is the internetwork connector having the device name C, and the frequency to be used is 30. This internetwork connector corresponds to the existing internetwork connector 121 shown in FIG. 1. Since it cannot communicate with the repeater 101 by radio, it receives a command via the internetwork connector having the device name C.

With regard to the internetwork connectors having the device name E or F, it is an internetwork connector managed by the other repeater having the device name of repeater 2, and it is indicated that the transfer destination of a command is the repeater 2, and the frequency to be used is 100.

Figure 6:
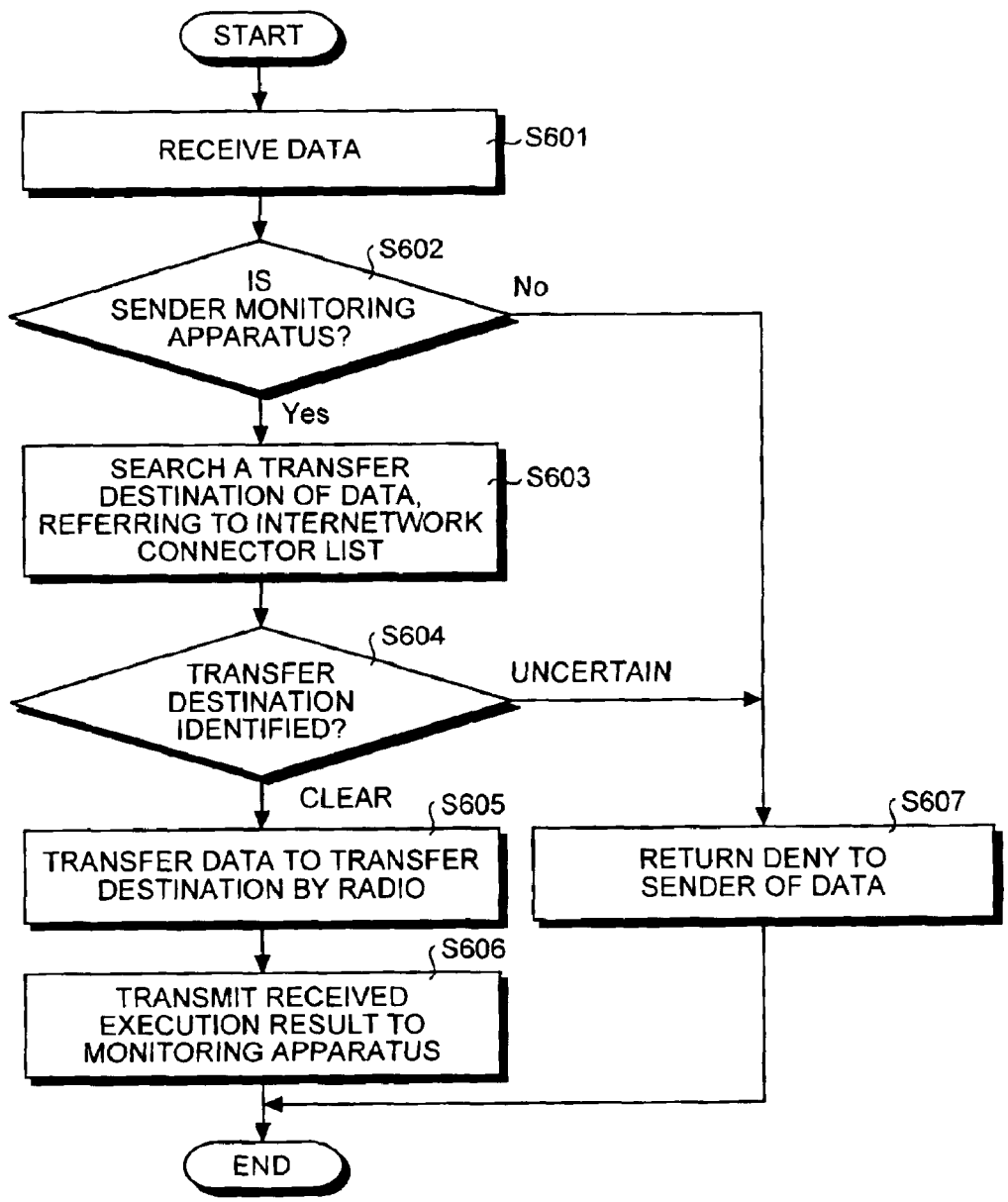
FIG. 6 is a flowchart of the operation of the repeater shown in FIG. 4.

FIG. 6 is a flowchart of the operation of the repeater 101. The transceiver 410 receives data by the telephone line (step S601), and delivers the data to the judgment unit 420.

The judgment unit 420 judges whether the received data is transmitted from the monitoring apparatus 100 (step S602). This judgment is for preventing an illegal access to the network, and is performed by registering the telephone number of the monitoring apparatus 100. Other security management may be used, such as managing the ID of the monitoring apparatus 100.

If the sender of the data is other than the monitoring apparatus 100, the transceiver 410 returns DENY to the sender of the data (step S607), and finishes the processing. On the other hand, if the sender of the data is the monitoring apparatus 100, the transceiver 410 searches a transfer destination of the data, referring to the internetwork connector list 440 (step S603), and judges whether there is the transfer destination (step S604).

If the transfer destination of the data is unknown, the transceiver 410 returns DENY to the sender of the data (step S607). On the other hand, when the transfer destination of the data is known, the radio controller 430 transfers the data to the transfer destination by radio (step S605). The command is then executed at the transfer destination, and the radio controller 430 receives the result of execution from the transfer destination, and delivers it to the transceiver 410. The transceiver 410 transmits the result of execution to the monitoring apparatus 100 by the telephone line (step S606).

Figures 7, 8:
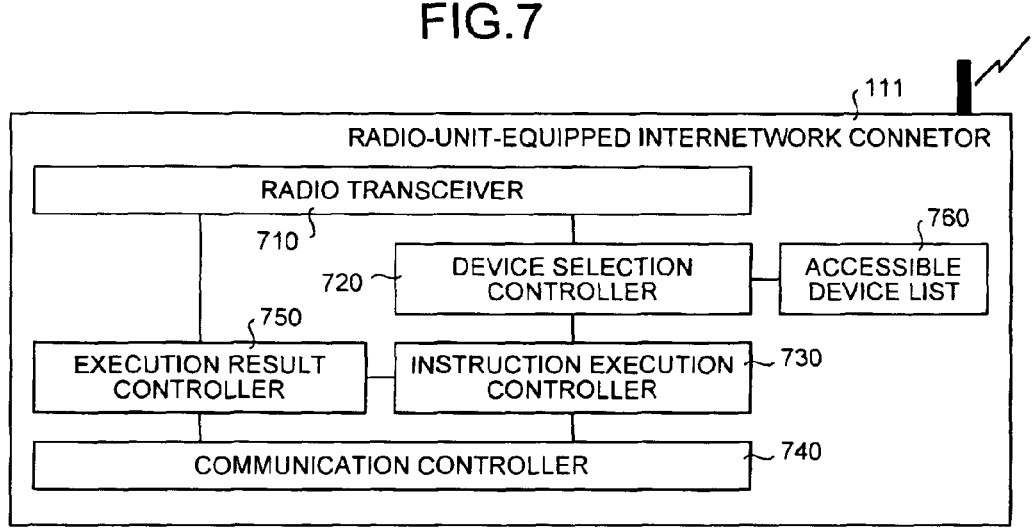
FIG. 7 is a block diagram of the functional configuration of a radio-unit-equipped internetwork connector shown in FIG. 1.
FIG. 8 is an example of an accessible device list provided in the radio-unit-equipped internetwork connector.

FIG. 7 is a block diagram of the functional configuration of the radio-unit-equipped internetwork connector 111. The radio-unit-equipped internetwork connector 111 includes a radio transceiver 710, a device selection controller 720, a command execution controller 730, a communication controller 740, a result of execution controller 750, and an accessible device list 760.

The radio transceiver 710 receives only a command transferred by using a frequency specified for the connector itself from among the commands transferred by the repeater 101. The radio transceiver 710 receives the result of execution of the command from the result of execution controller 750, and transmits the result of execution to the repeater 101, using the frequency specific to the connector itself.

The device selection controller 720 judges whether the transferred command is a command addressed to the connector itself or a command addressed to another existing internetwork connector, referring to the accessible device list 760. When the transferred command is a command addressed to the connector itself, the command execution controller 730 executes the command. On the other hand, if the transferred command is a command addressed to another existing internetwork connector, the command execution controller 730 requests the communication controller 740 to transfer the command to the existing internetwork connector.

The communication controller 740 transmits the command to the existing internetwork connector via the LAN, and receives the result of execution of the command via the LAN. The execution result controller 750 receives the result of execution from the command execution controller 730 or the communication controller 740, and delivers it to the radio transceiver 710.

The accessible device list 760 is a list storing the information relating to the internetwork connectors accessible by the radio-unit-equipped internetwork connector 111 via the LAN. FIG. 8 illustrates an example of the accessible device list 760 provided in the radio-unit-equipped internetwork connector 111.

The accessible device list 760 includes a device name field for names of the accessible internetwork connectors, an address field for the IP addresses of the accessible internetwork connectors, a port field for the port numbers of the accessible internetwork connectors, and a hop counts field for the number of devices passing through at the time of accessing this internetwork connector, for managing each internetwork connector.

For example, with regard to the internetwork connector having the device name A, it is indicated that the IP address is 10.17.201.1, the port number is E0, and the number of passing devices is 1. Similarly, with regard to the internetwork connector having the device name B, it is indicated that the IP address is 10.17.202.1, the port number is E0, and the number of passing devices is 1.

With regard to the internetwork connector having the device name C, the IP address, the port and the hop counts are omitted, which means that it is the connector itself. With regard to the internetwork connector having the device name D, it is indicated that the IP address is 10.17.204.1, the port number is E0, and the number of passing devices is 1.

Figure 9:
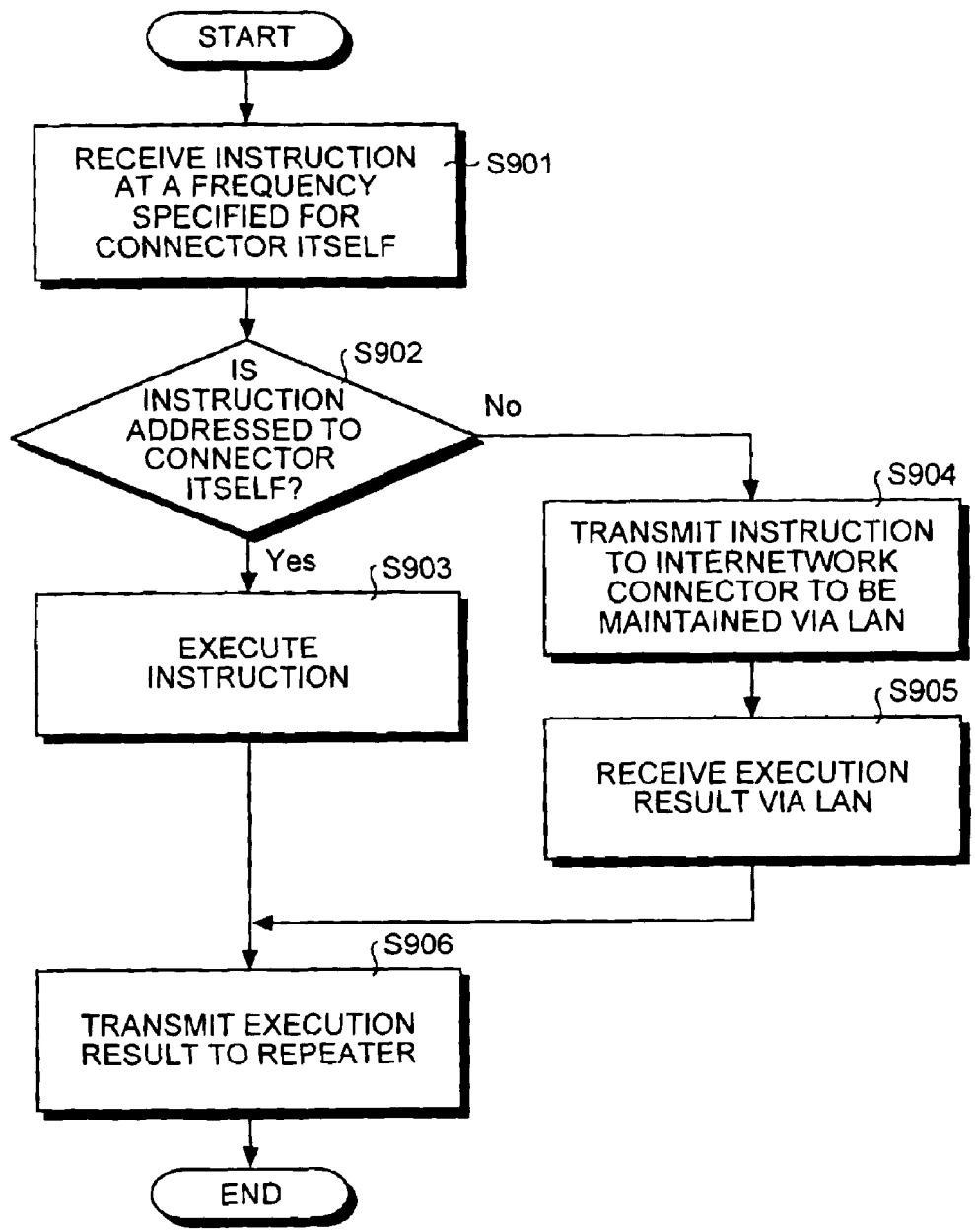
FIG. 9 is a flowchart of the operation of a radio-unit-equipped internetwork connector shown in FIG. 7.

FIG. 9 is a flowchart of the operation of the radio-unit-equipped internetwork connector 111. The radio transceiver 710 receives a command at a frequency specified for the connector itself (step S901), and delivers the command to the device selection controller 720. The device selection controller 720 judges whether the command is addressed to the connector itself or to another existing internetwork connector, referring to the accessible device list 760 (step S902).

If the destination of the command is the connector itself, the command execution controller 730 executes the command (step S903), and delivers the result of execution to the result of execution controller 740. On the other hand, if the destination of the command is another existing internetwork connector, the communication controller 740 transmits the command to the existing internetwork connector via the LAN (step S904).

The communication controller 740 receives the result of execution of the command transmitted from the existing internetwork connector via the LAN (step S905), and delivers the result of execution to the execution result controller 750. The execution result controller 750 delivers the result of execution to the radio transceiver 740, and the radio transceiver 740 transmits the result of execution to the repeater 101 (step S906).

Figure 10:
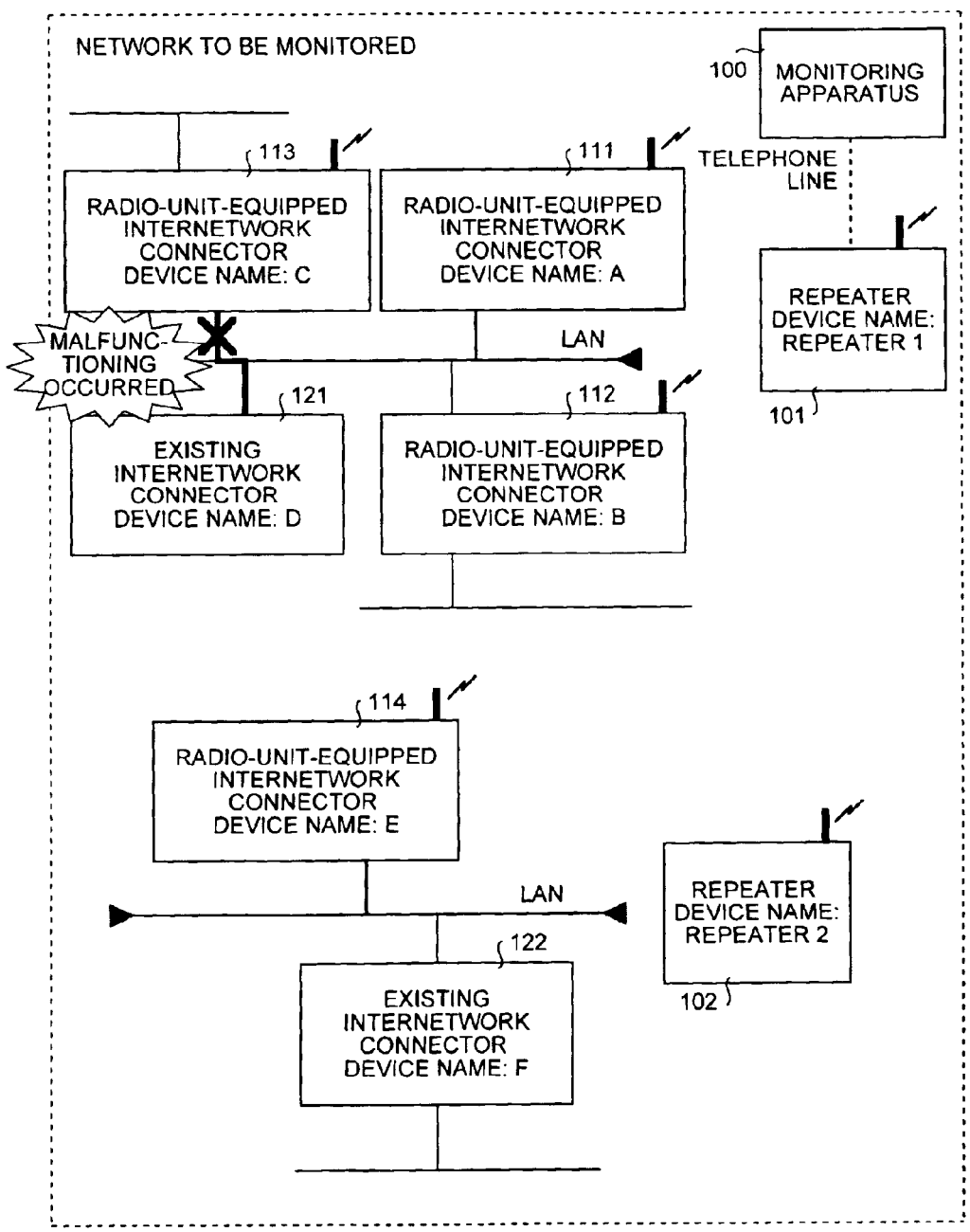
FIG. 10 illustrates a situation when a part of LAN is malfunctioning.

FIG. 10 illustrates the situation when a malfunctioning occurs in a part of the LAN. In this example, a malfunctioning occurs in a part of the LAN that connects the radio-unit-equipped internetwork connector 113 with the existing internetwork connector 121, and hence the radio-unit-equipped internetwork connector 113 cannot communicate with the existing internetwork connector 121.

Figure 11:
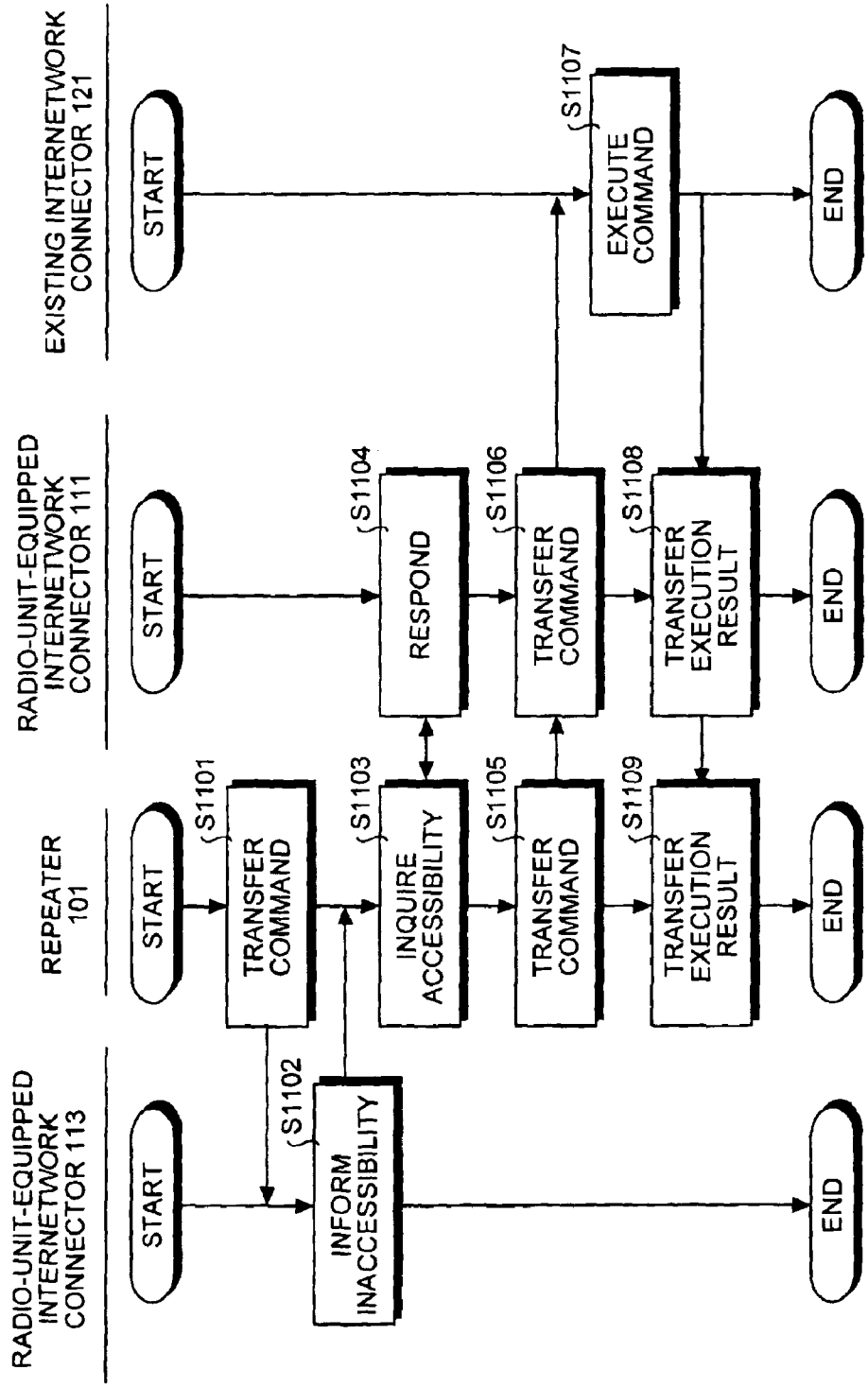
FIG. 11 is a flowchart of the operation of the remote monitoring system, when the malfunctioning shown in FIG. 10 occurs.

FIG. 11 is a flowchart of the operation of the remote monitoring system, when the malfunctioning explained with reference to FIG. 10 occurs. The repeater 101 transfers the command addressed to the existing internetwork connector 121 to the radio-unit-equipped internetwork connector 113 by radio (step S101). The radio-unit-equipped internetwork connector 113 informs the repeater 101 that it cannot access the existing internetwork connector 121 due to a malfunctioning in the LAN (step S1102).

The repeater 101 inquires of the other radio-unit-equipped internetwork connectors 111, 112, and the repeater 102 if an access to the existing internetwork connector 121 is possible (step S1103). The radio-unit-equipped internetwork connector 111 and the radio-unit-equipped internetwork connector 112 respond to the inquiry (step S1104).

The repeater 101 then transfers the command to the radio-unit-equipped internetwork connector that responds first (it is assumed to be the radio-unit-equipped internetwork connector 111 herein) (step S1105).

The radio-unit-equipped internetwork connector 111 transfers the command to the existing internetwork connector 121 (step S1106), and the existing internetwork connector 121 executes this command (step S1107), and transmits the result of execution of the command to the radio-unit-equipped internetwork connector 111.

The radio-unit-equipped internetwork connector 111 transfers the result of execution to the repeater 101 (step S1108). Finally, the repeater 101 transfers the received result of execution to the monitoring apparatus 100 (step 1109).

In this example, it is assumed that the radio-unit-equipped internetwork connectors 111 and 112 managed by the repeater 101 are the choice of the transfer destination of the data, however internetwork connectors managed by the other repeater 102 or the like can also access the existing internetwork connector 121, and if a device is equipped with a radio unit, the device can be choice of the transfer destination of the data. However, every time the data passing through the repeater 102 or the like, the hop counts of the radio-unit-equipped internetwork connector to be used increases by 1. Therefore, the repeater 101 selects the radio-unit-equipped internetwork connector responded first as the transfer destination of the data, among the radio-unit-equipped internetwork connectors having the hop counts equal to or less than a specific number.

As described above, according to the first embodiment, the repeaters 101 and 102 are installed between the monitoring apparatus 100 and the radio-unit-equipped internetwork connectors 111 to 114. The monitoring apparatus 100 and the repeater 101 are connected by a telephone line, and the repeater 101 is connected to the radio-unit-equipped internetwork connectors 111 to 113 and the repeater 102 by radio. The repeater 102 is further connected to the radio-unit-equipped internetwork connector 114 by radio. The monitoring apparatus 100 performs maintenance of the radio-unit-equipped internetwork connectors 111 to 114 and the existing internetwork connectors 121 and 122 from a remote area via the repeaters 101 and 102. As a result, the communication cost required for the remote maintenance of the internetwork connectors 111 to 114, 121, and 122 can be reduced, and the installation position of the monitoring apparatus 100 can be selected freely.

According to the first embodiment, the repeater 101 and the radio-unit-equipped internetwork connectors 111 to 113 are connected by radio. Therefore, a command can be transmitted to and executed by a plurality of radio-unit-equipped internetwork connectors simultaneously, and hence the information of the radio-unit-equipped internetwork connectors 111 to 113 can be obtained at the same time. As a result, maintenance with a high reliability can be realized.

According to the first embodiment, the repeater 101 is connected to the radio-unit-equipped internetwork connectors 111 to 113 and the repeater 102 by radio. The repeater 102 is also connected to the radio-unit-equipped internetwork connector 114 by radio. Therefore, communication is performed using a network for maintenance independent of the network to be maintained. As a result, even when a malfunctioning occurs in the network to be maintained, the monitoring apparatus 100 can access the radio-unit-equipped internetwork connectors 111 to 114, using radio, and hence a trouble-resistant remote monitoring system can be built.

According to the first embodiment, the existing internetwork connector 121 without having a radio unit communicates with the repeater 101 via the radio-unit-equipped internetwork connector 113 connected by the LAN. The existing internetwork connector 122 without having a radio unit communicates with the repeater 101 via the radio-unit-equipped internetwork connector 114 and the repeater 102 connected by the LAN. Therefore, the existing internetwork connectors 121 and 122 without having a radio unit can be maintained from a remote area.

According to the first embodiment, even when an access to the radio-unit-equipped internetwork connector 113 is not possible due to a malfunctioning in a part of the LAN, the existing internetwork connector 121 without having a radio unit can communicate with the repeater 101, if it can access either of the radio-unit-equipped internetwork connector 111 and the radio-unit-equipped internetwork connector 112. Therefore, a trouble-resistant remote monitoring system can be built even for the existing internetwork connector 121.

According to the first embodiment, since the repeater 101 can communicate with the radio-unit-equipped internetwork connector 114 and the existing internetwork connector 122 via the repeater 102, a computer network with a wide coverage can be maintained from a remote area.

In the first embodiment, the communication between the repeater 101 and the radio-unit-equipped internetwork connectors 111 to 113 and the repeater 102 is performed by radio having different frequencies. However, when the number of the radio-unit-equipped internetwork connectors and the repeaters increases, the number of frequencies required thereof also increases. Hence, it becomes difficult to use too many different frequencies. As a way to solve this problem, a second embodiment employs a radio communication by a single frequency using a control packet.

FIG. 12 is a block diagram of the functional configuration of the repeater according to the second embodiment. The functional unit having the same role as that of the unit shown in FIG. 4 is denoted by the same reference numeral, and the detailed explanation thereof is omitted.

A repeater 1201 includes a transceiver 410, a judgment unit 1220, a radio controller 1230, and an internetwork connector identification table 1240. The judgment unit 1220 judges whether the access to the repeater 1201 is correct. However, different from the judgment unit 420 shown in FIG. 4, it does not specify a transfer destination of a command and a frequency to be used. This is because the repeater 1201 uses a single frequency.

The radio controller 1230 communicates with the radio-unit-equipped internetwork connectors and other repeaters at a predetermined frequency, and manages the control packet. The radio controller 1230 transmits a control packet having a value that can uniquely identify the radio-unit-equipped internetwork connectors and other repeaters (a media access control (MAC) address in this example) to all radio-unit-equipped internetwork connectors and repeaters, by using the internetwork connector identification table 1240.

The internetwork connector identification table 1240 stores information for uniquely identifying the respective internetwork connectors to be maintained. FIG. 13 illustrates an example of the internetwork connector identification table 1240 provided in the repeater 1201. The internetwork connector identification table 1240 a device name field for names of the internetwork connectors and a MAC address field for the value that can uniquely identify the respective devices, for managing each internetwork connector.

For example, the internetwork connectors having the device name A has 00:00:00:00:01:01 as the MAC address uniquely identifying the connector, the internetwork connectors having the device name B has 00:00:00:00:05:01 as the MAC address uniquely identifying the connector, and the internetwork connectors having the device name C has 00:00:00:00:04:09 as the MAC address uniquely identifying the connector. Similarly, the internetwork connectors having the device name D has 00:00:00:00:01:06 as the MAC address uniquely identifying the connector, the internetwork connectors having the device name E has 00:00:00:00:02:05 as the MAC address uniquely identifying the connector, and the internetwork connectors having the device name F has 00:00:00:00:02:04 as the MAC address uniquely identifying the connector.

FIG. 14 is a block diagram of the functional configuration of the radio-unit-equipped internetwork connector 1411 according to the second embodiment. The functional unit having the same role as that of the unit shown in FIG. 4 is denoted by the same reference numeral, and the detailed explanation thereof is omitted.

The radio-unit-equipped internetwork connector 1411 includes a radio transceiver 1410, a device selection controller 1420, a command execution controller 730, a communication controller 740, an execution result controller 750, and an accessible device list 1430.

The radio transceiver 1410 communicates with a repeater 1201 by radio, receives a control packet transmitted by the repeater 1201, and delivers it to the device selection controller 1420.

The device selection controller 1420 judges whether the control packet is addressed to the connector itself or to another existing internetwork connector to be accessed via the LAN, based on the MAC address of the control packet. Since the device selection controller 1420 has a function of judging the destination of the control packet using the MAC address, communication between the repeater 1201 and a plurality of radio-unit-equipped internetwork connectors can be carried out by a single frequency.

The accessible device list 1430 stores the information relating to the internetwork connectors accessible by the radio-unit-equipped internetwork connector 1411 via the LAN. However, different from the accessible device list 760, the accessible device list 1430 only stores the information relating to the internetwork connectors, for which the radio-unit-equipped internetwork connector 1411 is in charge of transferring the command. This is for preventing a transfer from the repeater 1201 from being processed by a plurality of the radio-unit-equipped internetwork connectors.

Figure 15:
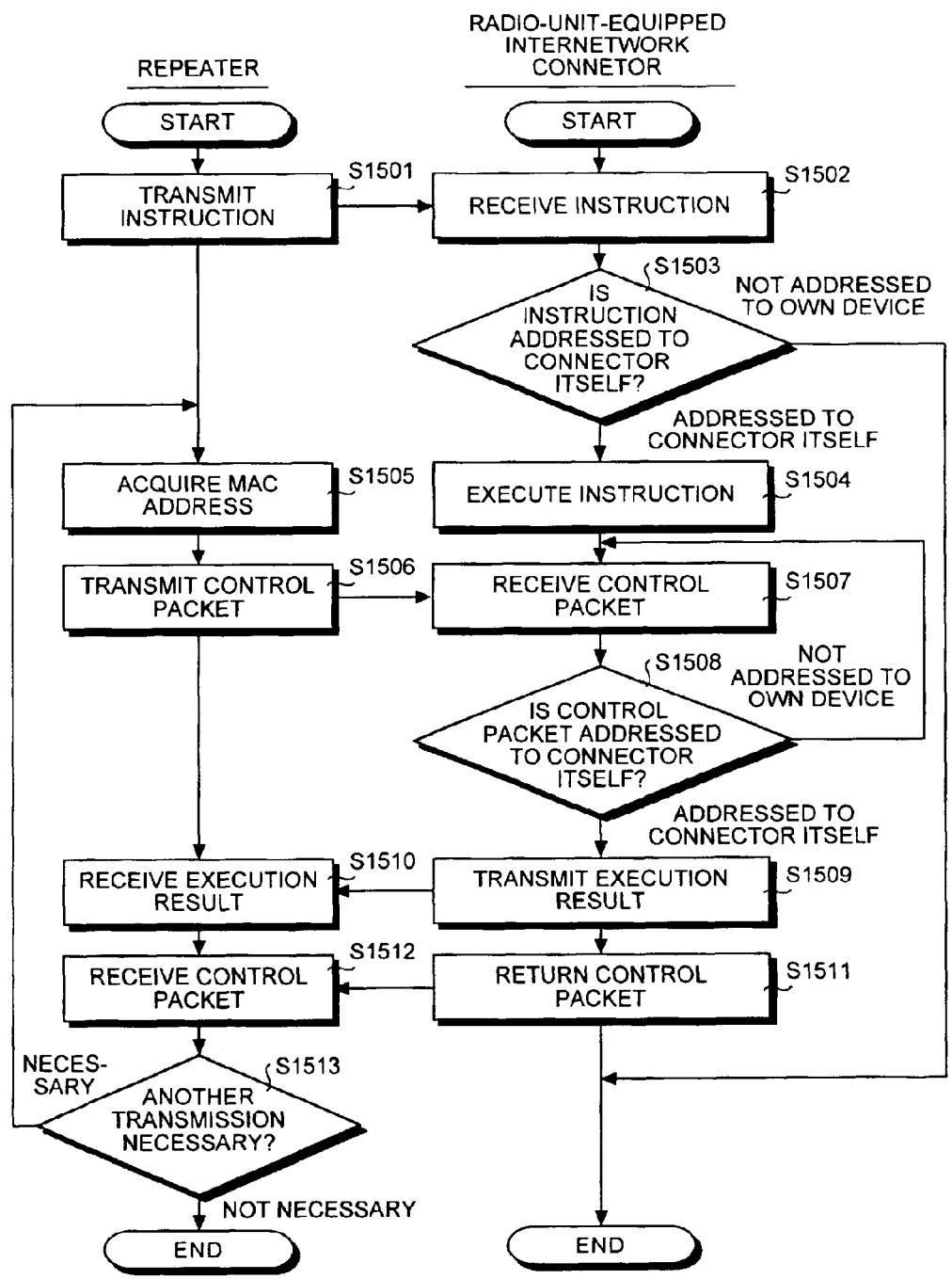
FIG. 15 is a flowchart of the communication between the repeater and the radio-unit-equipped internetwork connector according to the second embodiment.

FIG. 15 is a flowchart of the communication between the repeater 1201 and the radio-unit-equipped internetwork connector 1411.

The transceiver 410 in the repeater 1201 receives a command from the monitoring apparatus 100 by the telephone line, and delivers the received command to the radio controller 1230 via the judgment unit 1220. The radio controller 1230 transmits the command to all radio-unit-equipped internetwork connectors and repeaters using a predetermined frequency (step S1501).

The radio-unit-equipped internetwork connector receives the command transmitted by the repeater 1201 (step S1502), checks if the received command is addressed to the connector itself (step S1503). If it is not addressed to the connector itself, the radio-unit-equipped internetwork connector finishes the processing without doing anything. On the other hand, if the received command is addressed to the connector itself, the radio-unit-equipped internetwork connector executes the command (step S1504), and waits until a control packet is transmitted from the repeater 1201.

Thereafter, the repeater 1201 obtains the MAC address of the internetwork connector of the transfer destination based on the internetwork connector identification table 1240 (step S1505), and transmits the control packet having the MAC address to all radio-unit-equipped internetwork connectors and repeaters using a predetermined frequency (step S1506).

The radio transceiver 1410 in the radio-unit-equipped internetwork connector 1411 receives the control packet (step S1507), and delivers the control packet to the device selection controller 1420. The device selection controller 1420 checks the MAC address included in the control packet, and determines whether the destination of the control packet is the connector itself or the existing internetwork connector that receives the command via the connector itself (step S1508).

If the destination of the control packet is the connector itself or the existing internetwork connector that receives the command via the connector itself, the radio-unit-equipped internetwork connector transmits the result of execution of the command to the repeater 1201 (step S1509), and returns the control packet to the repeater 1201 (step S1511). On the other hand, if the destination of the control packet is other than the connector itself or the existing internetwork connector that receives the command via the connector itself, the radio-unit-equipped internetwork connector does not respond to the repeater 1201.

Upon receiving the result of execution of the command from the radio-unit-equipped internetwork connector (step S1510), and further receiving the control packet (step S1512), the repeater 1201 judges whether transmission of the control packet to other radio-unit-equipped internetwork connector is necessary (step S1513).

If it is necessary to transmit the control packet to other radio-unit-equipped internetwork connector, the repeater 1201 repeats the above processing for the next radio-unit-equipped internetwork connector. On the other hand, if it is not necessary to transmit the control packet to the other radio-unit-equipped internetwork connector, the repeater 1201 finishes the processing.

As described above, in the second embodiment, the repeater communicates with the radio-unit-equipped internetwork connector by using a control packet with a MAC address. Therefore, the repeater can communicate with a plurality of radio-unit-equipped internetwork connectors using a single frequency.

In the first and second embodiments, although remote maintenance is performed using a network for maintenance, which is independent of the network to be maintained, the network for maintenance can be used as a substitute network when a malfunctioning occurs in the network to be maintained, as explained in a third embodiment.

Figure 16:
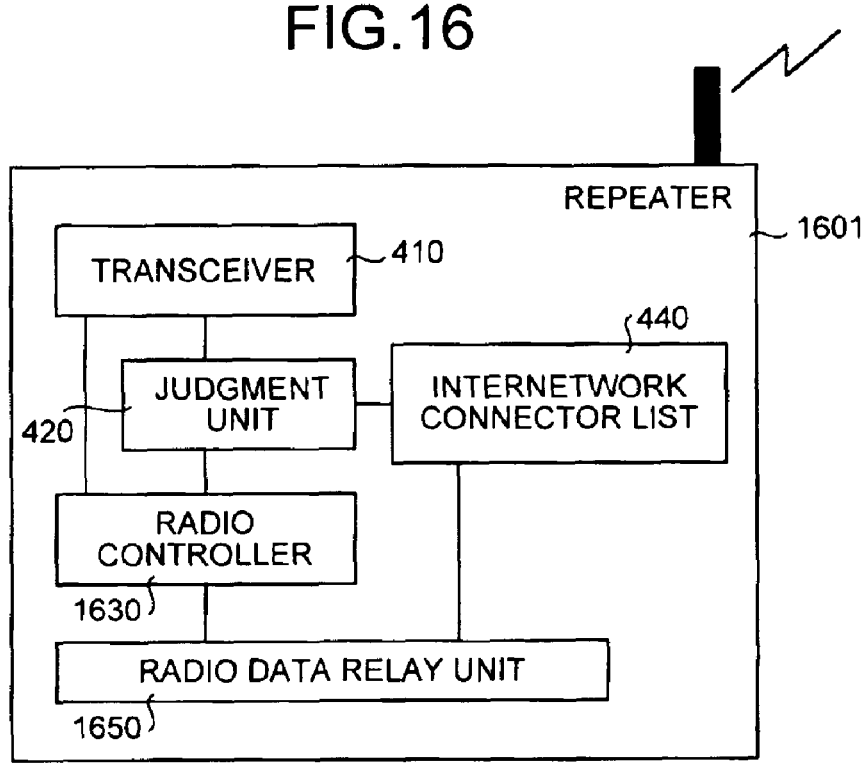
FIG. 16 is a block diagram of the functional configuration of a repeater according to a third embodiment of the present invention.

FIG. 16 is a block diagram of the functional configuration of a repeater according to the third embodiment. The functional unit having the same role as that of the unit shown in FIG. 4 is denoted by the same reference numeral, and the detailed explanation thereof is omitted.

The repeater 1601 includes a transceiver 410, a judgment unit 420, an internetwork connectors list 440, a radio controller 1630, and a radio data relay unit 1650. The radio controller 1630 communicates with the radio-unit-equipped internetwork connector by radio. The radio controller 1630 not only delivers the data received from the radio-unit-equipped internetwork connector to the transceiver 410, but also delivers the data to be transferred to another radio-unit-equipped internetwork connector to the radio data relay unit 1650.

The radio data relay unit 1650 relays data to be transmitted from the radio-unit-equipped internetwork connector to another radio-unit-equipped internetwork connector, linking up with the radio controller 1630. The radio data relay unit 1650 receives data from the radio controller 1630, obtains an operation frequency of the radio-unit-equipped internetwork connector of the transfer destination, by referring to the internetwork connectors list 440 from the destination in the data, and requests transmission at the obtained frequency to the radio controller 1630.

FIG. 17 is a block diagram of the functional configuration of the radio-unit-equipped internetwork connector 1711 according to the third embodiment. The functional unit having the same role as that of the unit shown in FIG. 7 is denoted by the same reference numeral, and the detailed explanation thereof is omitted.

The radio-unit-equipped internetwork connector 1711 includes a device selection controller 720, a command execution controller 730, an execution result controller 750, an accessible device list 760, a radio transceiver 1710, a communication controller 1740, a malfunctioning detector 1750, a communication switching unit 1760, a data transmitter 1770, and a data receiver 1780.

The radio transceiver 1710 communicates with a repeater 1601, using a frequency specific to the connector itself. The radio transceiver 1710 can communicate with an optional radio-unit-equipped internetwork connector via the repeater 1601.

The communication controller 1740 communicates with another internetwork connector using the LAN. However, when a malfunctioning occurs in the LAN, the communication controller 1740 communicates with other radio-unit-equipped internetwork connector by radio. The malfunctioning detector 1750 detects a malfunctioning in the LAN. The communication switching unit 1760 switches the communication medium from LAN to radio, when the malfunctioning detector 1750 detects a malfunctioning in the LAN.

The data transmitter 1770 receives transmission data from the communication controller 1740, and requests transmission to the radio transceiver 1710, when a malfunctioning occurs in the LAN. The data receiver 1780 delivers the data received by the radio transceiver 1710 to the communication controller 1740.

FIG. 18 is a flowchart of the communication between the repeater 1601 and the radio-unit-equipped internetwork connector 1711 according to the third embodiment. Here, a communication after a malfunctioning in the LAN has been detected by the malfunctioning detector 1750 and a communication switching process from LAN to radio has been carried out by the communication switching unit 1760 are explained.

A transmission request to another radio-unit-equipped internetwork connector is generated in the radio-unit-equipped internetwork connector 1711 (step S1801). Since the communication controller 1740 cannot use the LAN, the communication controller 1740 delivers the transmission data to the data transmitter 1770 (step S1802). The data transmitter 1770 requests the radio transceiver 1710 to transmit the data via the repeater 1601, and the radio transceiver 1710 transmits the data to the repeater 1601 (step S1803).

The radio controller 1630 in the repeater 1601 receives the radio data (step S1804), and delivers the data to the radio data relay unit 1650. The radio data relay unit 1650 obtains the operation frequency of the radio-unit-equipped internetwork connector of the data destination (step S1805), and requests data transmission using the obtained frequency to the radio controller 1630. The radio controller 1630 transmits the data to the radio-unit-equipped internetwork connector of the destination (step S1806).

The radio transceiver 1710 in the radio-unit-equipped internetwork connector of the data destination receives the data (step S1807), and delivers the data to the communication controller 1740 via the data receiver 1780 (step S1808).

As described above, according to the third embodiment, when a malfunctioning occurs in the network to be maintained, the repeater and the radio-unit-equipped internetwork connector are used to perform a substitute communication. Therefore, not only the remote maintenance is made possible, but also a trouble-resistant network system can be built.

The methods according to the present invention can be realized using a computer by using computer program. The computer program that contains instructions which when executed on the computer causes the computer to perform the method according to the present invention is recorded on a computer readable-recording medium. This computer readable-recording medium may be a floppy disk or a CD-ROM. Alternately the program may be stored at a server and the program may be downloaded when required. Otherwise, the program may be executed while it is at the server, i.e. without downloading from the server.

According to one aspect of the present invention, it is possible to obtain a remote maintenance repeater that can reduce the communication cost required for the remote maintenance of the internetwork connectors, and can build a trouble-resistant remote monitoring system having a high reliability.

According to another aspect of the present invention, it is possible to obtain a remote maintenance repeater that can reduce the communication cost required for the remote maintenance of the internetwork connectors, and a trouble-resistant remote monitoring system having a high reliability, using a single frequency.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A remote maintenance repeater used in a remote monitoring system, wherein the remote monitoring system includes at least one internetwork connector that connects a plurality of networks and a monitoring apparatus that monitors and remotely maintains the at least one internetwork connector, comprising:

a command receiving unit that receives a command from the monitoring apparatus;

a destination selecting unit that selects a transfer destination device to which the command is to be transferred, wherein the transfer destination device is an internetwork connector or another remote maintenance repeater;

a command transmitting unit that transmits the command to the transfer destination device, at a specific frequency specific to the transfer destination device;

a result receiving unit that receives a result of execution of the command from the transfer destination device at the specific frequency; and a result transmitting unit that transmits the result to the monitoring apparatus.

2. The remote maintenance repeater according to claim 1, further comprising a substitute radio data relay unit that receives data from a specific internetwork connector by radio and transmits the data to another internetwork connector, upon occurrence of a malfunctioning in a network to which the internetwork connector is connected.

3. A remote maintenance repeater used in a remote monitoring system, wherein the remote monitoring system includes at least one internetwork connector that connects a plurality of network and a monitoring apparatus that monitors and remotely maintains the at least one internetwork connector, comprising:

a command receiving unit that receives a command from the monitoring apparatus;

an information obtaining unit that obtains an identification information for uniquely identifying a transfer destination device comprising an internetwork connector or another remote maintenance repeater, to which the command is transferred;

a packet generating unit that generates a control packet including the identification information;

a radio command transmitting unit that transmits the control packet and the command by radio at a predetermined frequency;

a radio result receiving unit that receives a result of execution of the command by radio; and a result transmitting unit that transmits the result to the monitoring apparatus.

4. The remote maintenance repeater according to claim 3, further comprising a substitute radio data relay unit that receives data from a specific internetwork connector by radio and transmits the data to another internetwork connector, upon occurrence of a malfunctioning in a network to which the internetwork connector is connected.

5. An internetwork connector that connects a network with another network, the internetwork connector by way of a remote maintenance repeater, comprising:

a radio command receiving unit that receives a command from a remote maintenance repeater by radio at a specific frequency specific to the internetwork connector;

a command executing unit that executes the command; and a radio result transmitting unit that transmits a result of execution to the remote maintenance repeater by radio at the specific frequency.

6. The internetwork connector according to claim 5, further comprising a communication unit that transmits the command to an internetwork connector, which does not have a radio communication function, connected to the same network and receives the result of execution via the network.

7. The internetwork connector according to claim 6, further comprising:

a malfunctioning detecting unit that detects a malfunctioning in a network to which the internetwork connector is connected;

a medium switching unit that switches a communication medium from the network to the radio based on the detection of malfunctioning;

a substitute data receiving unit that receives data from the remote maintenance repeater by radio; and a substitute data transmitting unit that transmits the data to the remote maintenance repeater by radio.

8. An internetwork connector that connects a network with another network, comprising:

a radio command receiving unit that receives a control packet and a command from a remote maintenance repeater by radio at a predetermined frequency;

a response judging unit that makes a judgment whether it is appropriate to respond to the remote maintenance repeater based on the identification information included in the control packet;

a responding unit that responds to the remote maintenance repeater based on the judgment;

a command executing unit that executes the command; and a radio result transmitting unit that transmits a result of execution by radio at the predetermined frequency.

9. The internetwork connector according to claim 8, further comprising a communication unit that transmits the command to an internetwork connector, which does not have a radio communication function, connected to the same network and receives the result of execution via the network.

10. The internetwork connector according to claim 9, further comprising:

a malfunctioning detecting unit that detects a malfunctioning in a network to which the internetwork connector is connected;

a medium switching unit that switches a communication medium from the network to the radio based on the detection of malfunctioning;

a substitute data receiving unit that receives data from the remote maintenance repeater by radio; and a substitute data transmitting unit that transmits the data to the remote maintenance repeater by radio.

11. A remote maintenance repeating method for a remote monitoring system, wherein the remote monitoring system includes at least one internetwork connector that connects a plurality of networks and a monitoring apparatus that monitors and remotely maintains the at least one internetwork connector, comprising:

receiving a command from the monitoring apparatus;

selecting a transfer destination device comprising an internetwork connector or another remote maintenance repeater, to which the command is to be transferred;

transmitting the command to the transfer destination device by radio at a specific frequency specific to the transfer destination device;

receiving a result of execution of the command from the transfer destination device by radio at the specific frequency; and transmitting the result to the monitoring apparatus.

12. A maintenance method for an internetwork connector that connects a network with another network, the internetwork connector being connected to a monitoring apparatus that monitors and remotely maintains the internetwork connector by way of a remote maintenance repeater, comprising:

receiving a command from a remote maintenance repeater by radio at a specific frequency specific to the internetwork connector;

executing the command; and transmitting a result of execution to the remote maintenance repeater by radio at the specific frequency.

13. A computer program that realizes a remote maintenance repeating method for a remote monitoring system on a computer, wherein the remote monitoring system includes a plurality of internetwork connectors that respectively connect a network with another network and a monitoring apparatus that monitors and remotely maintains the internetwork connectors, the computer program making the computer execute:

receiving a command from the monitoring apparatus;

selecting a transfer destination device comprising an internetwork connector or another remote maintenance repeater, to which the command is to be transferred;

transmitting the command to the transfer destination device by radio at a specific frequency specific to the transfer destination device;

receiving a result of execution of the command from the transfer destination device by radio at the specific frequency; and transmitting the result to the monitoring apparatus.

14. A computer program that realizes a maintenance method for an internetwork connector that connects a network with another network on a computer, the computer program making the computer execute:

receiving a command from a remote maintenance repeater by radio at a specific frequency specific to the internetwork connector;

executing the command; and transmitting a result of execution to the remote maintenance repeater by radio at the specific frequency.

15. A remote maintenance repeater used in a remote monitoring system, wherein the remote monitoring system includes at least one internetwork connector that respectively connects a plurality of networks and a monitoring apparatus that monitors and remotely maintains the at least one internetwork connector, comprising:

a command receiving unit that receives a command from the monitoring apparatus;

a destination selecting unit that selects a transfer destination device from a plurality of transfer destination devices, wherein each transfer destination device is an internetwork connector or another remote maintenance repeater, each transfer destination having an individual operating frequency;

a command transmitting unit that selects a transmission frequency to match the individual operating frequency of the transfer destination device and that transmits the command to the transfer destination device at the individual operating frequency of the transfer destination device;

a result receiving unit that receives a result of execution of the command from the transfer destination device at the specific frequency; and a result transmitting unit that transmits the result to the monitoring apparatus.

16. A remote maintenance repeater according to claim 15, wherein at least two of the transfer destination devices have the same individual operating frequency.

\* \* \* \* \*

UNITED STATES PATENT AND TRADEMARK OFFICE
CERTIFICATE OF CORRECTION

PATENT NO. : 6,947,872 B2 Page 1 of 1
APPLICATION NO. : 10/665408
DATED : September 20, 2005
INVENTOR(S) : Saori Miyata et al.

It is certified that error appears in the above-identified patent and that said Letters Patent is hereby corrected as shown below:

Column 15, line 10, delete "network" and insert --networks--

Column 15, line 36, after "connector" insert --being connected to a monitoring apparatus that monitors and remotely maintains the internetwork connector--

Signed and Sealed this

Fourth Day of July, 2006

JON W. DUDAS
*Director of the United States Patent and Trademark Office*